United States Patent [19]

Chao

[11] Patent Number: 5,883,689

[45] Date of Patent: *Mar. 16, 1999

[54] AUXILIARY FRAMES WITH CLAMPING MEMBERS INCLUDING RESILIENT MECHANISMS

[75] Inventor: David Yinkai Chao, Towson, Md.

[73] Assignee: Contour Optik Inc., Chiayi, Taiwan

[*] Notice: The term of this patent shall not extend beyond the expiration date of Pat. No. 5,877,838.

[21] Appl. No.: 848,101

[22] Filed: Apr. 28, 1997

[51] Int. Cl.⁶ .................................................. G02C 9/00
[52] U.S. Cl. ................................................. 351/47; 351/57
[58] Field of Search ................................ 351/47, 48, 57, 351/58, 44, 41

[56] References Cited

U.S. PATENT DOCUMENTS

| 4,070,103 | 1/1978 | Meeker . |  |
|---|---|---|---|
| 5,568,207 | 10/1996 | Chao | 351/57 |
| 5,642,177 | 6/1997 | Sunreeve . |  |

FOREIGN PATENT DOCUMENTS

| 76209045 | 9/1976 | China . |
| 1061253 | 4/1995 | European Pat. Off. . |
| G 85 07 761 U | 6/1985 | Germany . |
| G 88 06 898 U | 10/1988 | Germany . |
| 2-109325 | 8/1990 | Japan . |
| 7-128620 | 5/1995 | Japan . |
| WO 90/09611 | 8/1990 | WIPO . |

OTHER PUBLICATIONS

Documents describing Twincome in a Patent Opposition Proceeding in Germany initiated by Pentax, on or around Apr. 30, 1997.

*Primary Examiner*—Hung Xuan Dang
*Attorney, Agent, or Firm*—Fliesler Dubb Meyer & Lovejoy, LLP

[57] ABSTRACT

An eyeglass device includes a primary frame having two side studs. The studs each has a recess. An auxiliary frame for disposing in front of the primary frame includes two sides each having a clamping member for engaging with the stud and for securing the auxiliary frame to the primary frame. The clamping members each includes a channel for engaging with the stud and each includes a spring member having one or more bulges for engaging with the stud and for securing the auxiliary frame to the primary frame. The bulges may engage with the recesses of the studs.

6 Claims, 1 Drawing Sheet

AUXILIARY FRAMES WITH CLAMPING MEMBERS INCLUDING RESILIENT MECHANISMS

BACKGROUND OF THE INVENTION

1. Field of the Invention

The present invention relates to an auxiliary frame for eyeglasses, and more particularly to an auxiliary frame having a coupling mechanism for coupling to the typical eyeglasses.

2. Description of the Prior Art

Typical auxiliary frames for eyeglasses comprise one or more magnets secured to the side portions or the peripheral portions for engaging with the magnets provided in the primary frame and for securing to the primary frame. The auxiliary frame may not be easily secured to the typical eyeglasses having no magnets therein.

The present invention has arisen to mitigate and/or obviate the afore-described disadvantages of the conventional auxiliary frames.

SUMMARY OF THE INVENTION

The primary objective of the present invention is to provide an auxiliary frame having one or more securing members for securing to the primary frame of the typical eyeglasses.

In accordance with one aspect of the invention, there is provided an eyeglass device comprising a primary frame including two sides each having a stud, and an auxiliary frame for disposing in front of the primary frame, the auxiliary frame including two sides each having a clamping member for engaging with the stud and for securing the auxiliary frame to the primary frame.

The clamping members each includes a channel for engaging with the stud and for defining a pair of arms for engaging with the stud.

The clamping members each includes a biasing means engaged in the channel for biasing against the stud and for stably retain the stud in place.

The biasing means each includes a spring member having at least one bulge for engaging with the stud.

The clamping members each includes a pair of flanges for engaging with the spring member and for preventing the spring member from being disengaged from the clamping member.

The studs each includes a recess for engaging with the bulge of the spring member and for allowing the clamping members to be stably secured to the studs.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
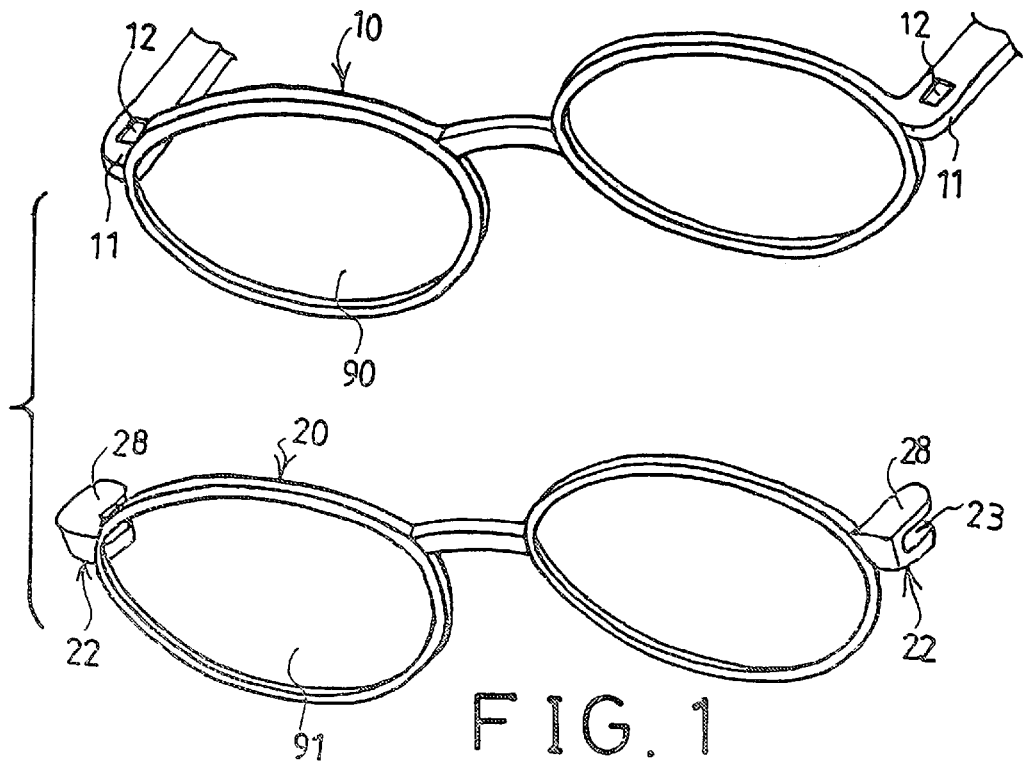
FIG. 1 is an exploded view of an auxiliary frame coupling mechanism accordance with the invention.
Figure 2:
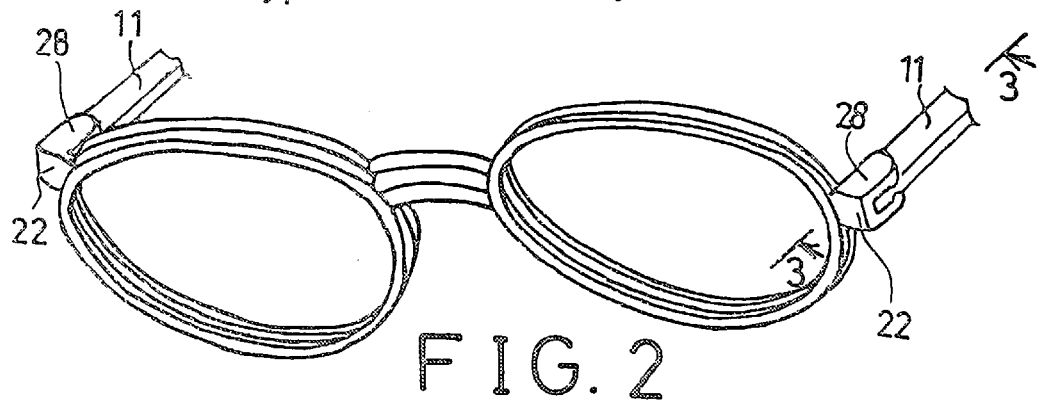
FIG. 2 is a perspective view of the auxiliary frame coupling mechanism.
Figure 3:
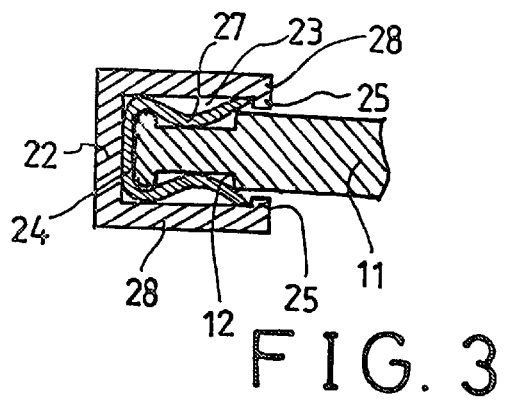
FIG. 3 is a cross sectional view taken along lines 3—3 of FIG. 2.

Referring to the drawings, and initially to FIGS. 1–3, an eyeglass device in accordance with the present invention comprises a primary frame 10 for supporting primary lenses 90 and including two studs 11 formed in the side portions. The studs 11 each includes a pair of recesses 12 formed in the upper and the lower portions. An auxiliary frame 20 for supporting auxiliary lenses 91 and for disposing in front of the primary frame includes two clamping members 22 disposed in the side portions and extended rearward. The clamping members 22 each includes a channel 23 for engaging with the studs 11 of the primary frame 10 and for securing the studs 11 in the clamping members 22. The clamping members 22 each includes two arms 28 having the channel 23 formed between the arms 28. The clamping members 22 each includes a spring member 24 having one or more bulges 27 for engaging with the studs 11 and for securing the auxiliary frame 20 to the primary frame 10.

The clamping members 22 each includes two flanges 25 for engaging with the spring members 24 and for retaining the spring members 24 in the clamping members 22. It is preferable that the studs 11 each includes a depression 12 for engaging with the bulges 27 and for allowing the spring members 24 to stably retaining the studs 11 in place.

It is to be noted that, without the spring members 24, the channel 23 may includes a size equals to or less than that of the stud 11 for allowing the arms 28 of the clamping members 22 to force-fittedly engaging with the stud 11 and for allowing the arms 28 to stably secure the auxiliary frame to the primary frame. The clamping members 22 and the spring members 24 allow the auxiliary frame to be easily secured to the typical eyeglasses having no magnets and having no recesses 12 therein. The provision of the recesses 12 is to facilitate the engagement of the spring members 24 with the studs 11.

Accordingly, the eyeglass device in accordance with the present invention includes an auxiliary frame having two clamping members for allowing the auxiliary frame to be easily and solidly and stably secured to the typical primary frame of the eyeglasses.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass device comprising:

a primary frame including two sides each having a stud, and an auxiliary frame for disposing in front of said primary frame, said auxiliary frame including two sides each having a clamping member for engaging with said stud and for securing said auxiliary frame to said primary frame, wherein said clamping members each includes a resilient mechanism for stably retaining one of said studs in place, and for easily securing said auxiliary frame to said primary frame.

2. An eyeglass device according to claim 1, wherein said clamping members each includes a channel for engaging with said stud and for defining a pair of arms for engaging with said stud.

3. An eyeglass device according to claim 2, wherein each resilient mechanism is engaged in one of said channels.

4. An eyeglass device according to claim 3, wherein each resilient mechanism includes a spring member having at least one bulge for engaging with said stud.

5. An eyeglass device according to claim 4, wherein said clamping members each includes a pair of flanges for engaging with said spring member and for preventing said spring member from being disengaged from said clamping member.

6. An eyeglass device according to claim 4, wherein said studs each includes a recess for engaging with said bulge of said spring member and for allowing said clamping members to be stably secured to said studs.

* * * * *